US005232640A

United States Patent [19]

Legressus et al.

[11] Patent Number: 5,232,640

[45] Date of Patent: Aug. 3, 1993

[54] PROCESS FOR THE PRODUCTION OF AN ELECTRICAL INSULANT WITH A HIGH BREAKDOWN VOLTAGE IN VACUO

[75] Inventors: Claude Legressus, Fontenay le Fleury; Pierre Bach, Alfort; Claude Faure, Lesigny, all of France

[73] Assignee: Commissariat a l'Energie Atomique, Paris, France

[21] Appl. No.: 743,188

[22] Filed: Aug. 9, 1991

[51] Int. Cl.[5] .............................................. B29C 71/00

[52] U.S. Cl. .................................. 264/40.2; 264/40.1; 264/235; 264/346

[58] Field of Search ............... 264/40.2, 66, 346, 40.1, 264/235

[56] References Cited

U.S. PATENT DOCUMENTS

| | | | |
|---|---|---|---|
| 2,270,872 | 1/1942 | Goede et al. | 264/40.2 |
| 4,069,357 | 1/1978 | Miller et al. | 427/123 |

OTHER PUBLICATIONS

IEEE Transactions on Electrical Insulation, vol. EI-15, No. 5, Oct. 1980, New York, pp. 419-428, Miller: "Improving the voltage holdoff . . . ".

IEEE Transactions on Electrical Insulation, vol. EI-11, No. 1, Mar. 1976, New York, pp. 32-35, Sudarshan et al: "The effect of the chromium oxide coatings on . . . ".

*Primary Examiner*—Jan H. Silbaugh
*Assistant Examiner*—Christopher A. Fiorilla
*Attorney, Agent, or Firm*—Oblon, Spivak, McClelland, Maier & Neustadt

[57] ABSTRACT

Process for the production of an electrical insulant (5) placed in an intense electrical field, particularly between two electrodes (1, 2) of an electron tube. The insulant (5) is a crystalline material, whose free surfaces (7) in vacuo (6) have been treated so as to reduce or eliminate crystallization defects. The treatment is checked by measurements of a particular optical or mechanical property of the free surfaces. The breakdown voltage can be multiplied by three or four compared with conventional insulants and can approach the breakdown voltage of the vacuum.

7 Claims, 1 Drawing Sheet

PROCESS FOR THE PRODUCTION OF AN ELECTRICAL INSULANT WITH A HIGH BREAKDOWN VOLTAGE IN VACUO

DESCRIPTION

The invention relates to a process for the production of an electrical insulant with a high breakdown voltage in vacuo.

Very intense electrical fields prevail between the electrodes of numerous electronic components such as tubes. It is normally necessary to place electrical insulants in these electrical fields in order to support the electrodes, but it has been found that then the breakdown voltage between the electrodes drops considerably compared with the breakdown voltage in vacuo, no matter what the form of the insulant.

The reduction of the voltage behavior is dependent on the nature of the insulating material and its volume electrical behaviour properties (i.e. the maximum electrical field which can be withstood by the solid without any internal disruption), the surface state of the insulant and the way in which the transition is formed between the insulant and the metal constituting the electrodes (type of soldering and soldering temperature).

DESCRIPTION OF THE PREFERRED EMBODIMENT

Figure 1:
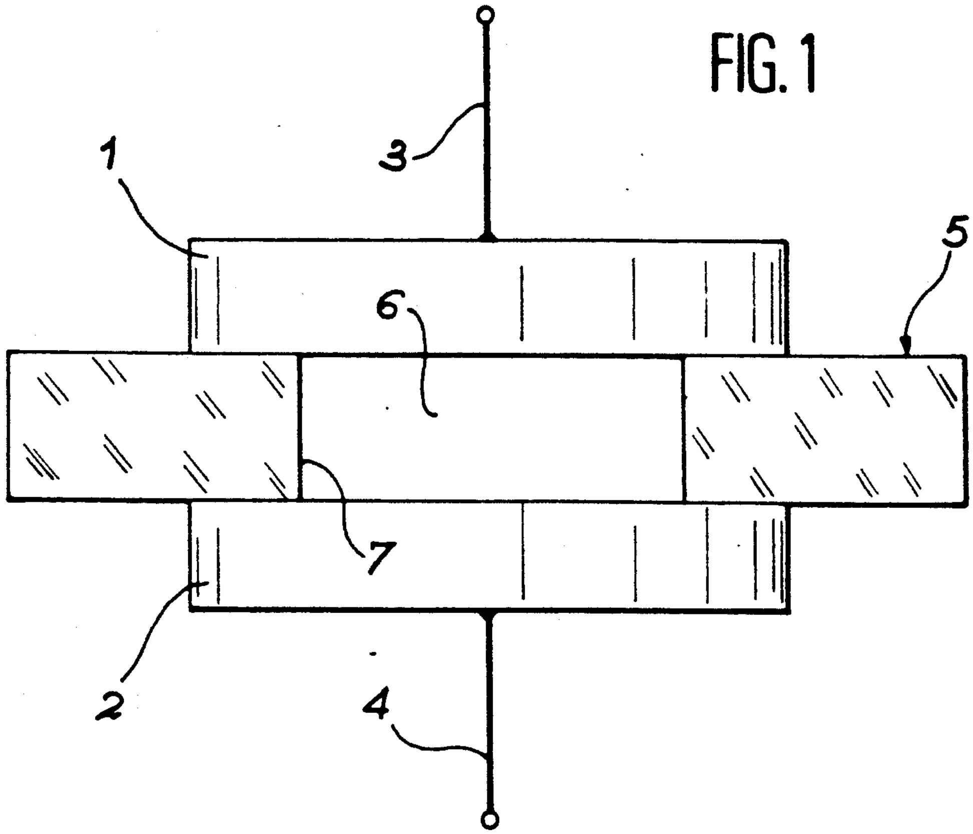
FIG. 1 illustrates the phenomenon and FIG. 2 the comparative results of an experiment on the checking and control of insulants.

Two electrodes 1 and 2 are in the form of small plates facing one another and supplied by a wire, respectively 3 and 4. A washer secured between the peripheries of the two electrodes 1 and 2 and which leaves free a central space 6 forms an insulant or insulator 5. The phenomenon would essentially be the same with an envelope-like insulant surrounding the two electrodes 1 and 2 and perforated to permit the passage of the wires 3 and 4.

A vacuum prevails in the central space 6. The exterior of the component is insulated by a liquid (oil), a solid (resin) or a gas (sulphur hexafluoride). According to conventional theory, if an electron close to the electrode 1 is torn from the free surface 7 of the insulant 5 in front of the central space 6 and projected in the direction of the other electrode 2, it will trigger an avalanche of secondary electrons dropping on the free surface 7. The resulting current amplification will lead to the breakdown of the insulant 5.

This theory was favoured by scientists for several decades and several solutions were proposed for inhibiting the secondary emission of electrons. Thus, the free surfaces 7 were coated with materials having low emission properties. In a 1970 publication T. S. Sudarshan and J. Cross proposed covering the surface of a ceramic with chromium oxide, which has a secondary emission coefficient below 1. As said layer is fragile, other authors (H. C. Miller et al) proposed using mixtures of titanium and manganese which, by heating, penetrate the insulating material and form a covering. In this document and the prior art, the function of said covering is to reduce the secondary surface emission.

The complete device has also been placed in a magnetic field in order to move away from the free surface 7 the trajectories of the emitted electrons and therefore preventing them dropping on it. Consideration was also given to the possibility of inclining the free surface 7, so as to make the electrons emitted pass through longer trajectories before dropping, thereby reducing the number of amplification stages. However, all these measures have proved inadequate for significantly improving the breakdown behaviour of the insulant 5 and this theory has now not been upheld for several years.

The present invention proposes a new theory for explaining the breakdown phenomenon. According to this theory, the breakdown can be attributed to the relaxation of the polarization energy of the insulant in the electrical field, which causes an ionization of the defects of the solid from which the insulant 5 is formed. These defects are either crystallinity defects (vacant sites of the lattice, chemical impurities, etc.), or in more general terms for dielectrics, all the imperfections which lead to local discontinuities of the electrical permittivity. Electrostatic forces cause rearrangements of the defects if they are relatively strong. Beyond a critical threshold, the resulting energy releases can aid a breakdown in the high permittivity gradient zones. Thus, the rearrangements of the defects involve displacements of particles close to the free surface 7, which compromise the quality of the vacuum at this location and explain why the breakdown voltage between the electrodes 1 and 2 is close to its value in a high pressure gas.

The production process according to the invention for an electrical insulant therefore consists, once an insulating material has been shaped by machining or some other process for obtaining an insulating part having a predetermined form, treating the part in such a way as to reduce or eliminate defects close to the free surfaces of the part to be placed in the vacuum, at least on those which will be placed in a strong electrical field.

The solid material can be a monocrystal, a polycrystal or a vitreous material. Among the possible surface treatments, reference is made to strictly controlled annealing.

The treatment is advantageously accompanied by a check on the discontinuity of the permittivity of the treated free surfaces of the part using measurements of electrostatic, optical or mechanical properties of these surfaces. It has been found and demonstrated that the quality of the breakdown behaviour could be correlated with such properties. The discovery of this correlation leads to extremely important consequences on a practical scale. Hitherto, it has been standard practice to characterize and check the qualities of a material or the qualities of a treatment by measurements performed under high voltage. It was necessary to produce a sleeve, solder or fix the electrodes at its ends and form the vacuum in the sleeve. High voltage measurements require very severe precautions to be taken, namely insulation of the exterior of the device and protection of personnel against electrocution risks. Moreover, the measurement is not representative of the actual insulant.

It is the overall insulant result and the contacts between the insulant and the metal which is measured.

As a result of these novel checking methods, it is possible to characterize the intrinsic quality of an insulant without it being necessary to carry out high voltage tests. As a function of the insulant used, the precision required and the desired ease of performance, one or other checking method will be chosen.

For example, optical methods are very suitable for monocrystalline insulants, being non-destructive and sensitive. The electrostatic method is very sensitive, but it makes it necessary to place the samples under vacuum. The mechanical methods are very fast, but are less accurate.

It will be considered that the electrodes 1 and 2 have a vacuum breakdown voltage of 300 kV. The breakdown voltage obtained with a conventionally prepared insulant 5 is approximately 50 kV. However, a breakdown voltage of 200 kV was obtained with a monocrystalline sapphire insulant 5 annealed at 1000° C. in accordance with the invention. The check or inspection consisted of a reflectance measurement making it possible to follow the evolution of the refractive index on the free surface 7. Preliminary tests or a mathematical model make it possible to obtain a nomogram enabling the measurements to be immediately interpreted.

For example, monocrystalline sapphire sleeves (external diameter 30 nm, internal diameter 26 mm, length 11 mm) underwent different annealing cycles characterized by the temperature, the annealing time and the cooling time. All the other parameters were identical, so that a Gaertner type ellipsometer was used for measuring the imaginary part k of the complex refractive index $n-jk$. It was found that this index varies by several orders of magnitude for temperature differences of about 100° C. and it is possible to reach very low values with very long cooling times (exceeding 1 hour). Correlatively, it was found that the breakdown voltage of these sleeves, when soldered with a manganesezinc alloy to Dilver P electrodes, improves considerably (table I).

The invention can be realized in many other ways, both with respect to the choice of material and the treatment. It is possible to use a piezoelectric quartz produced under machining conditions preserving the intrinsic properties of the material and which in particular do not destroy the mesh lattice of the crystal on the surface thereof. For this purpose a minimum tool contact pressure and cutting speed are chosen, as well as a good lubrication (e.g. using methanol). Machining is followed by an annealing treatment with a programmed cycle. The effect of the annealing is checked by the optical reflectance method.

For example, a piezoelectric quartz tube cut on the axis of revolution parallel to the most intense piezoelectric direction, of diameter 20 mm and length 11 mm, follows the annealing cycles and, after each cycle, checks the value of the complex refractive index. The value of this index was correlated with the voltage behaviour measured in vacuo by fastening two electrodes to the quartz tube (table II).

Thus, such a monocrystalline material is able to resist breakdown voltages of 250 kV very close to the vacuum breakdown voltage. In addition, this result was obtained without any "conditioning", i.e. without the prior slow rendering live normally necessary to enable the insulant to reach its theoretical breakdown resistance value. This operation makes it possible to reduce local defects linked with the presence of conductive impurities and which would cause the immediate breakdown of the insulant at a very low value if it was placed without any precautions in an electrical field. However, certain applications, particularly in space, may make such a conditioning impossible.

It is probable that other insulants prepared according to the invention would also have this property. Use was made of a polycrystal constituted by a mixture of alumina, zirconia and yttrium oxide and the powder mixture of these three components was fritted at high temperature.

For example, use was made of powders having a grain size between 1 and 5 microns. The volume percentage of the components is as follows:

| | |
|---|---|
| $Al_2O_3$ | 78% |
| $ZrO_2$ | 20% |
| $Y_2O_3$ | 2% |

Fritting took place in air at 1550° C.

The composition of the insulant (presence of defects, percentage of the various constituents in the case of the mixture) and the treatments are characterized, optimized and checked by an electrostatic method.

This extremely sensitive, fast method is an original use of scanning electron microscopy (SEM). The innovation consists of measuring the electrical field of the insulant bombarded by an electron beam and deducing from this measurement the capacity of the insulant to withstand a voltage without breaking down.

Ideally, the optical column of the microscope must operate from a minimum voltage (0.01 kV) to a maximum voltage (30 to 50 kV) and the optical column must remain aligned when the voltage is changed from the highest value to the lowest value. In practice, most standard commercial apparatuses satisfy these conditions and are usable for this type of measurement.

In a first operating phase, the high voltage electron beam is used for negatively charging the insulant sample. In a second operating phase the low voltage electron beam is used for functioning in the "mirror" mode, the beam being reflected on an equipotential surface of the charged insulant. This equipotential surface is therefore visible on the screen of the SEM.

This operating mode makes it possible to plot the curve $1/r=f(Vs)$, r being the radius of the equipotential surface Vs, where the low energy electron beam is reflected. The gradient of this curve is the ratio of the dielectric constant to the total charge implanted in the insulant. The optimum of a mixture or a treatment is obtained when the gradient reaches a minimum.

Figure 2:
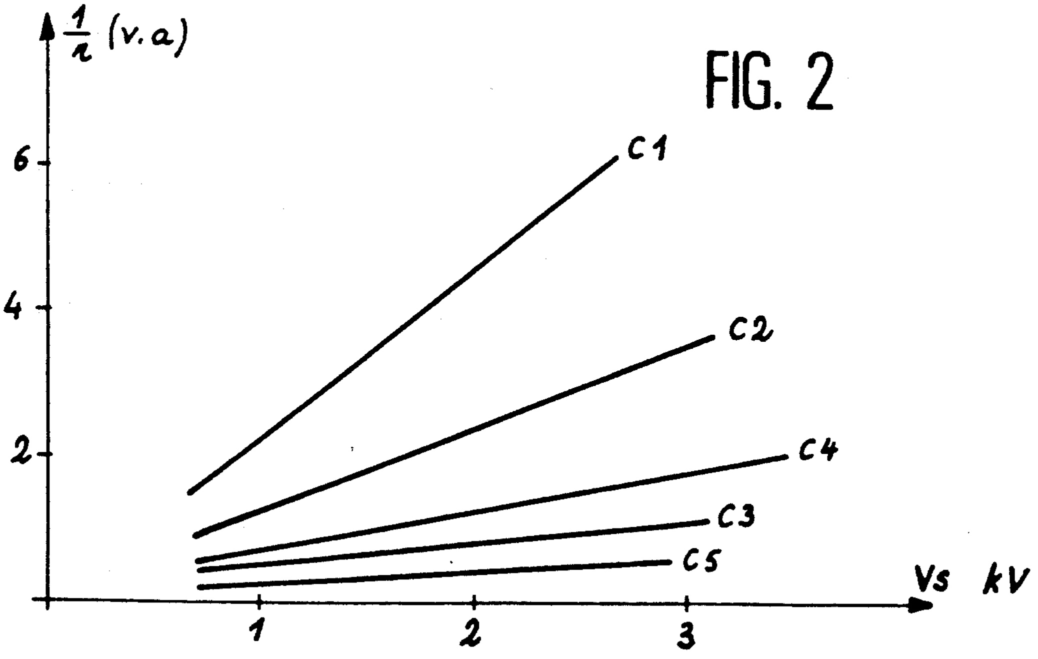

For example, this method was used for optimizing an alumina-zirconia-yttrium oxide mixture. The results appear in the following graph. The best results are obtained with the third mixture (table III, cf. also FIG. 2).

TABLE III

| Mixture (%) | | | |
|---|---|---|---|
| $Al_2O_3$ | $ZrO_2$ | $Y_2O_3$ | Curve |
| 98 | 0 | 2 | 1 |
| 88 | 10 | 2 | 2 |
| 78 | 20 | 2 | 3 |
| 68 | 30 | 2 | 4 |

The breakdown voltage measured on a sleeve of diameter 30 mm and length 11 cm is 60 kV in the case of the mixture (No. 3 in table III). It is markedly better than with the other mixtures for which 50 kV is not exceeded. The voltage behaviour is further improved when the sleeve undergoes a prior annealing treatment.

After annealing at 1100° C. for 5 hours and cooling for 10 hours, the electrostatic method establishes that the loss of the line $1/r=f(Vs)$ decreases (curve 5) and the breakdown voltage is 70 kV.

Another check making it possible to establish the intrinsic quality of an insulant is the microindentation hardness test. Measurement takes place of the value of the stress intensity factor k1c of sleeves and the efficiency of a polycrystalline mixture and an annealing cycle are characterized.

For example, on a sleeve constituted by 98% $Al_2O_3$ and 2% $Y_2O_3$ it is possible to measure k1c$=3.5$ $MPam^{1/2}$.

After annealing at 1100° C. for 5 hours and cooling for 10 hours, it is possible to measure k1c$=2.3$ $MPam^{1/2}$.

The above figures are given in an exemplified manner. The same proportions between them are obtained from other vacuum breakdown voltage values.

TABLE I

| | | | | |
|---|---|---|---|---|
| Annealing temperature (°C.) (annealing time 1 hour) | 800 | 900 | 1000 | 1000 |
| Cooling time (hours) | 4 | 4 | 4 | 10 |
| Complex refractive index (measured at 6328 Å) | $5 \cdot 10^{-2}$ | $10^{-2}$ | $7 \cdot 10^{-3}$ | $1.2 \cdot 10^{-3}$ |
| Breakdown voltage (kV) Dilver P electrodes vacuum $10^{-7}$ bar | 70 | 80 | 110 | 200 |

TABLE II

| | | | | |
|---|---|---|---|---|
| Annealing temperature (°C.) | 800 | 900 | 1000 | 1000 |
| Cooling time (hours) | 4 | 4 | 4 | 10 |
| Complex refractive index (measured at 5461 Å) | $2 \cdot 10^{-2}$ | $5 \cdot 10^{-3}$ | $2 \cdot 10^{-3}$ | $5 \cdot 10^{-4}$ |
| Breakdown voltage (kV) | 80 | 90 | 150 | 250 |

We claim:

1. A process for the production of an electrical insulator, the process comprising shaping a monocrystalline, solid insulating material to obtain an insulating part having a predetermined shape, annealing said shaped part to reduce or eliminate crystallization defects or electric permittivity discontinuities on free surfaces of the shaped part, and monitoring the permittivity of the treated free surfaces.

2. Process for the production of an electrical insulator according to claim 1, characterized in that the monocrystal is piezoelectric quartz.

3. Process for the production of an electrical insulator according to claim 2, characterized in that the optical property is the reflectance.

4. Process for the production of an electrical insulator according to claim 1, characterized in that it comprises monitoring the permittivity of the treated free surfaces of the part by measuring an optical property on said surfaces.

5. Process for the production of an electrical insulator according to claim 1, characterized in that it comprises monitoring the permittivity of the treated free surfaces of the part by measuring a mechanical property on said surfaces.

6. Process for the production of an electrical insulator according to claim 5, characterized in that the mechanical property is hardness.

7. Process for the production of an electrical insulator according to claim 1, characterized in that it comprises monitoring the permittivity of the treated free surfaces of the part by measuring an electrical property by means of a scanning electron microscope.

* * * * *